United States Patent [19]

Parrish, Jr. et al.

[11] Patent Number: 5,163,560
[45] Date of Patent: Nov. 17, 1992

[54] CONTAINER FOR STORING AND CARRYING A PORTABLE COMPUTER

[76] Inventors: Lloyd K. Parrish, Jr., 3362 Riverdale Rd.; Richard D. Haddock, 4044 Frior, both of Wichita, Kans. 67204

[21] Appl. No.: 704,061

[22] Filed: May 22, 1991

[51] Int. Cl.⁵ .............................................. B65D 85/38
[52] U.S. Cl. ................................. 206/576; 206/305; 206/320; 346/145; 364/708; 190/125
[58] Field of Search ................................ 346/145 X; 364/705.01 X, 708; 190/115, 118, 109, 124, 125 X, 900; 206/305 X, 320 X, 576, 232, 328, 334, 37

[56] References Cited

U.S. PATENT DOCUMENTS

| | | | |
|---|---|---|---|
| 4,340,139 | 7/1982 | Wilcox et al. | 190/109 X |
| 4,458,813 | 7/1984 | Tushinsky et al. | 206/320 |
| 4,790,431 | 12/1988 | Reel et al. | 364/705.01 X |
| 4,837,590 | 6/1989 | Sprague | 346/145 |
| 4,855,845 | 8/1989 | Thrush | 206/320 X |
| 4,896,776 | 1/1990 | Kabanuk et al. | 206/576 |
| 5,002,184 | 3/1991 | Lloyd | 206/576 X |
| 5,050,740 | 9/1991 | Lucero | 190/109 X |

Primary Examiner—Paul T. Sewell
Assistant Examiner—Jacob K. Ackun, Jr.
Attorney, Agent, or Firm—John Wade Carpenter

[57] ABSTRACT

A doubled wall container having a base and a pair of container sides pivotally secured to the base. Each of the container sides has a ridge member.

7 Claims, 10 Drawing Sheets

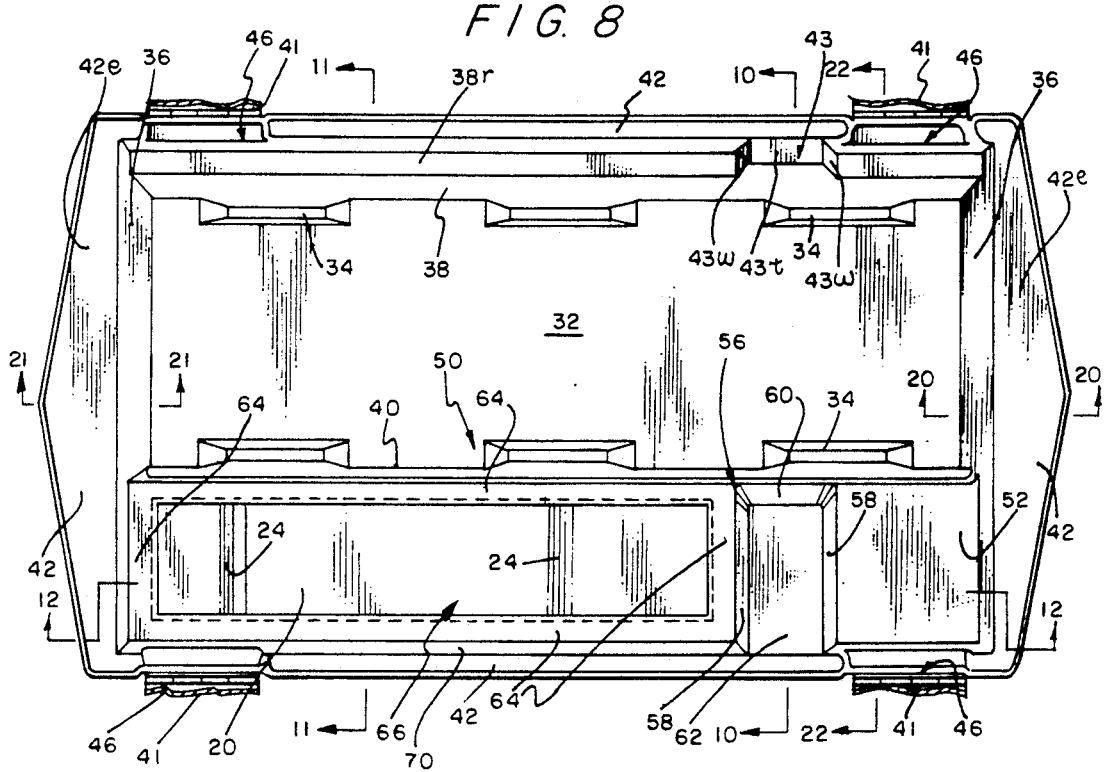
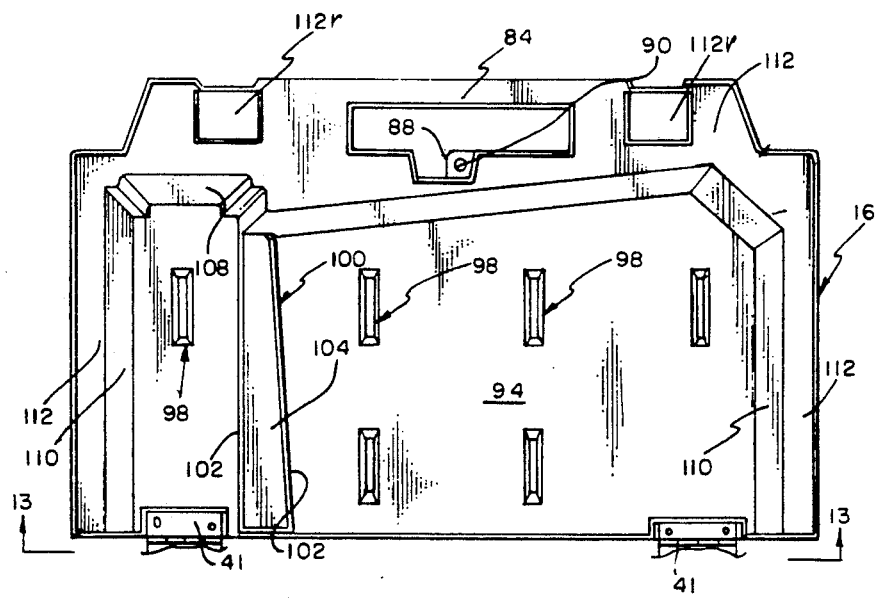

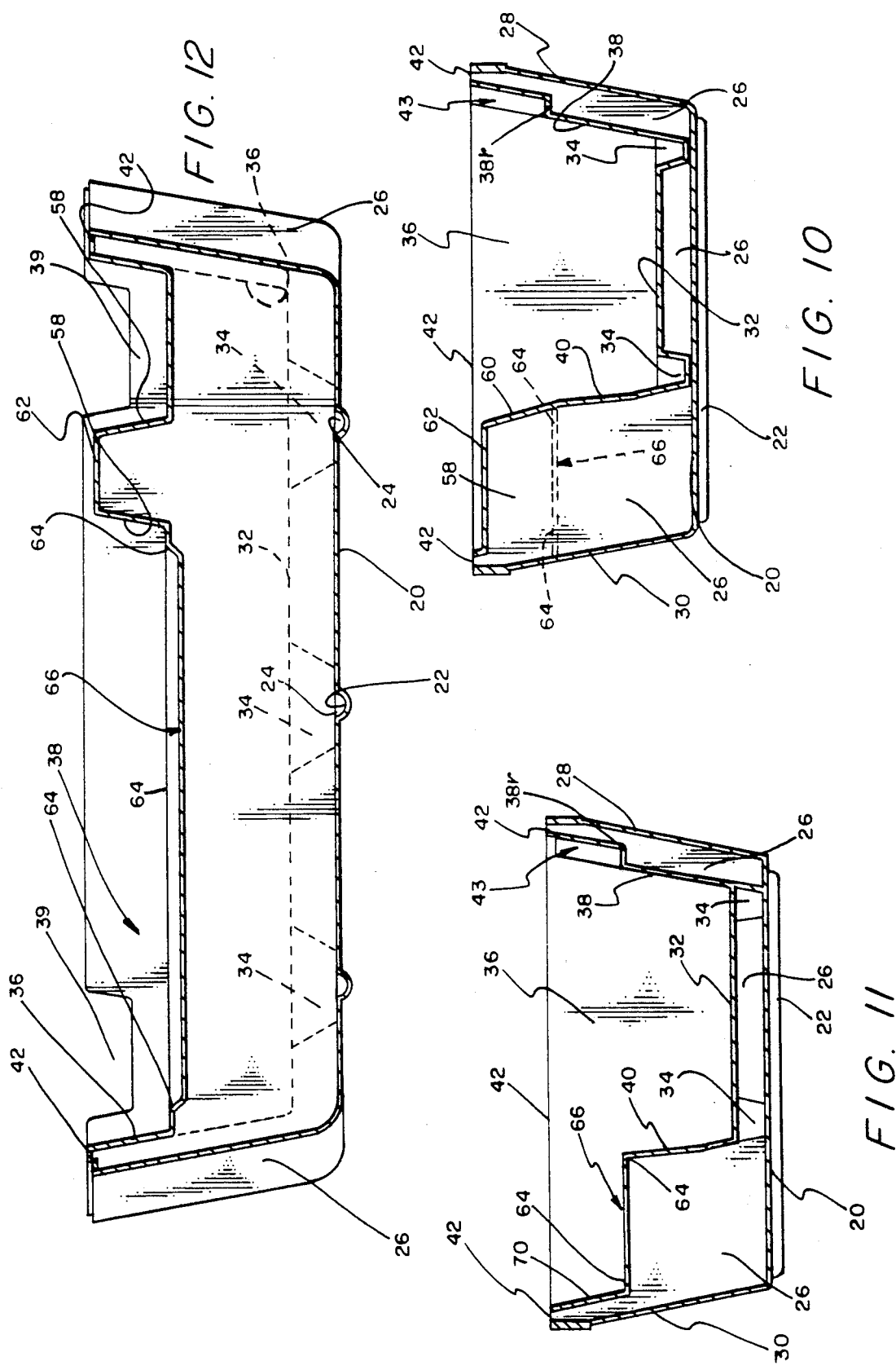

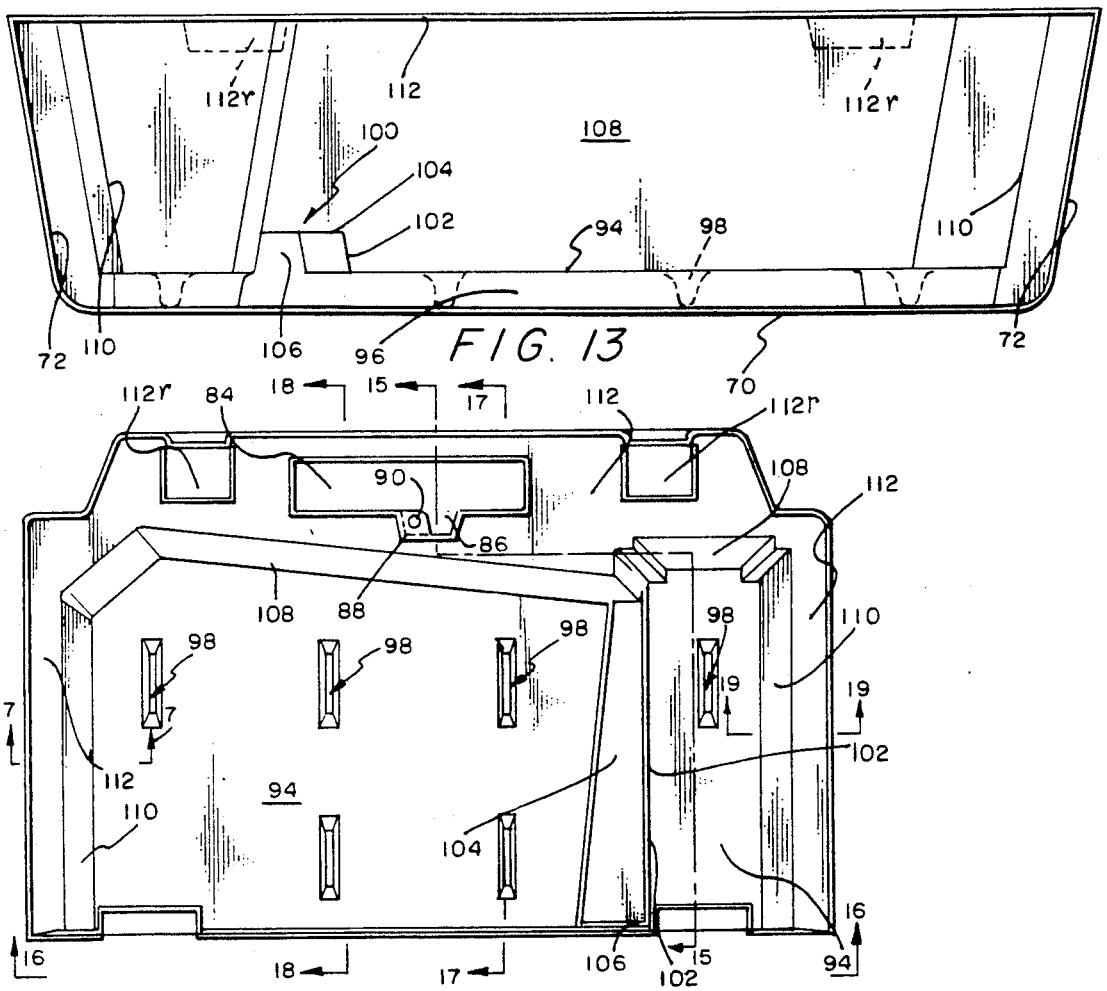
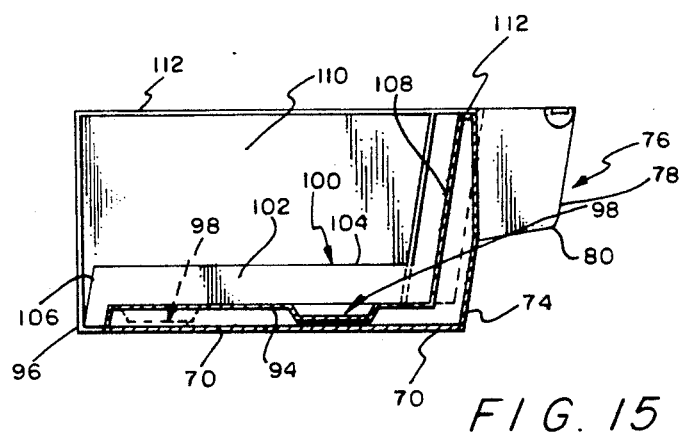

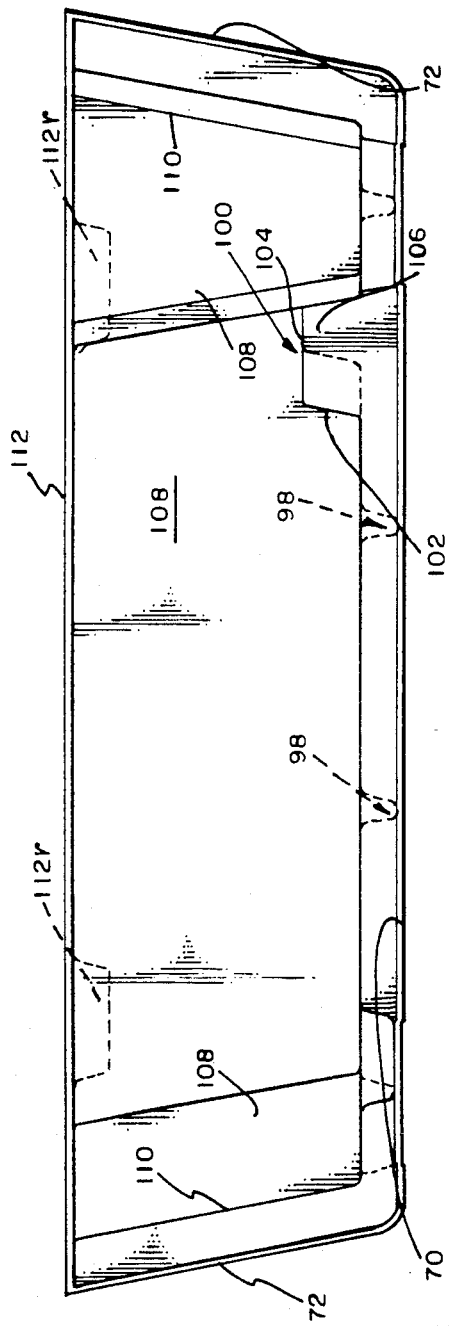
FIG. 16
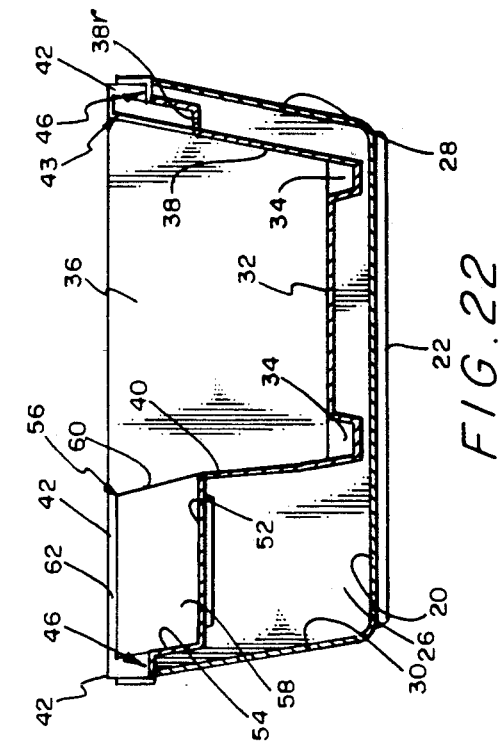
FIG. 22
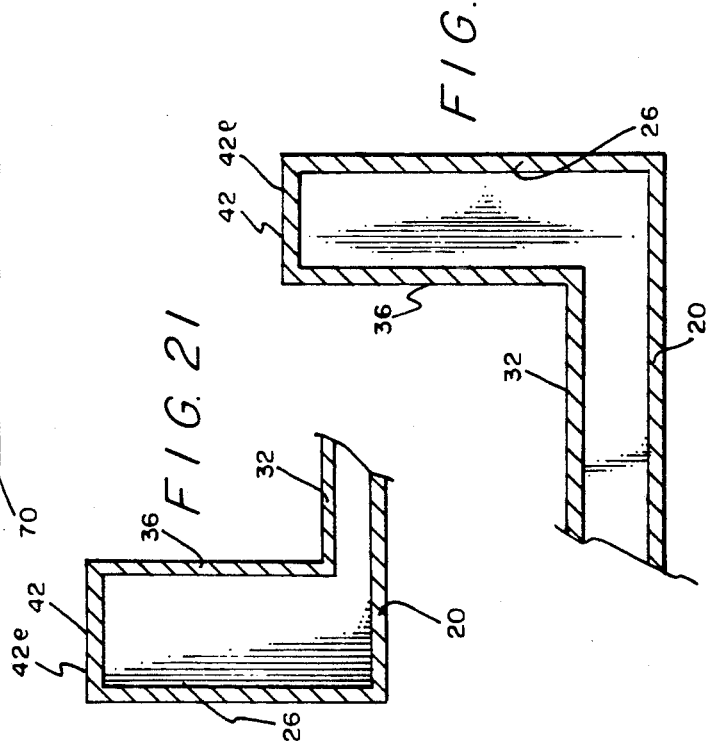
FIG. 21
FIG. 20

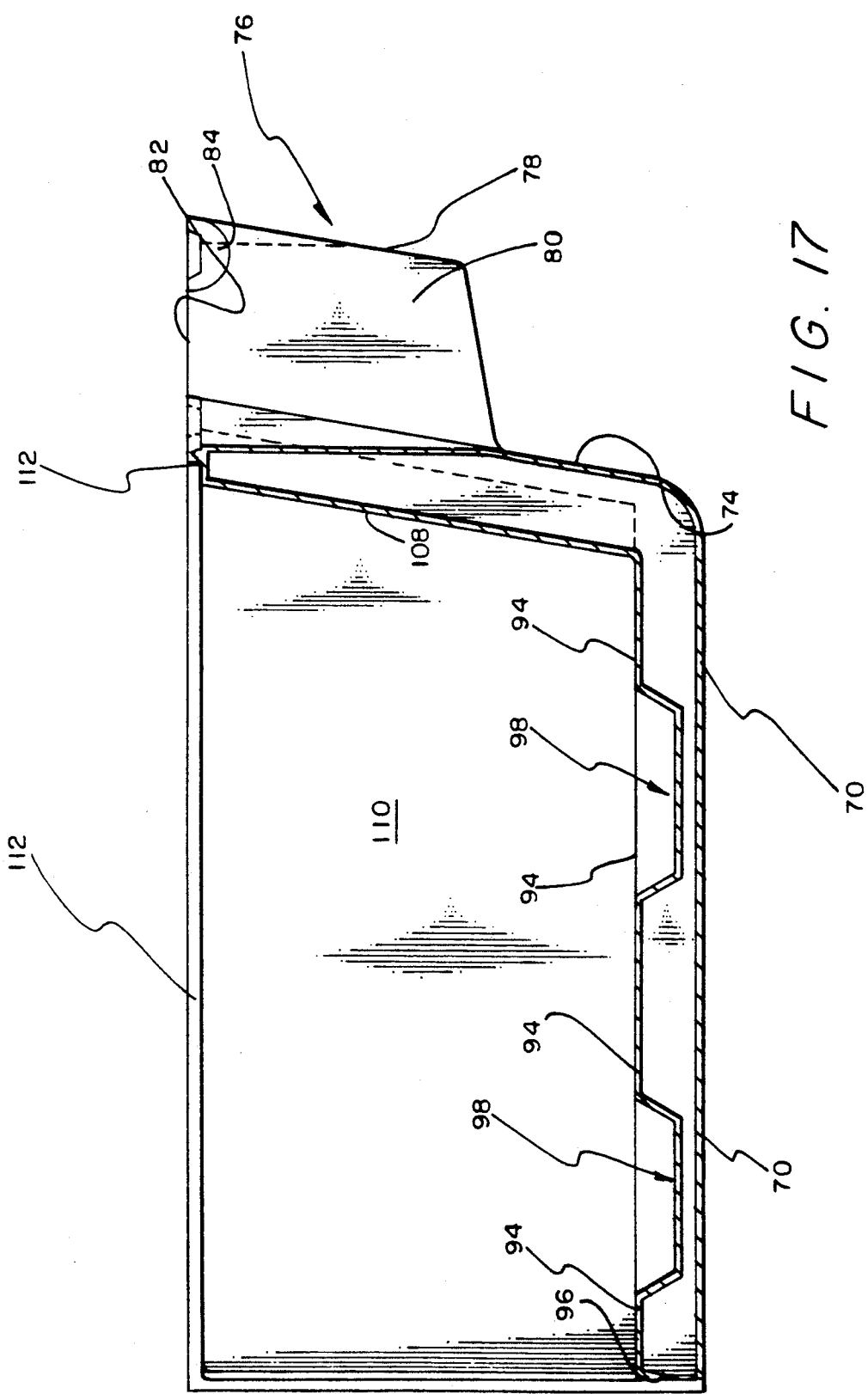

CONTAINER FOR STORING AND CARRYING A PORTABLE COMPUTER

FIELD OF THE INVENTION

The invention is related to a container. More specifically, this invention provides for an apparatus for storing and carrying a portable computer.

DESCRIPTION OF THE PRIOR ART

A patentability investigation was conducted and the following U.S. Pat. Nos. were discovered:
- U.S. Pat. No. 189,868—titled: CARRYING CASE, Casselman.
- U.S. Pat. No. 190,148—titled: PORTABLE WARNING UNIT, Reuben, Jr.
- U.S. Pat. No. 243,974—titled: COMBINED BRIEFCASE AND CLIPBOARD, Tracy.
- U.S. Pat. No. 284,527-titled: CARRYING CASE FOR A PERSONAL COMPUTER, Davis
- U.S. Pat. No. 4,658,956—titled: PORTABLE CASE FOR A SMALL SIZE AUDIO-VISUAL SENSORY APPARATUS, Takeda et al.
- 790,431—titled: CARRYING CASE FOR STORING A COMPUTER AND A PRINTER OPERATIVELY CONNECTED THERETO, Reel et al.
- U.S. Pat. No. 4,803,652—titled: PORTABLE TRANSCEIVER, Maeser et al.
- U.S. Pat. No. 4,833,547—titled: PORTABLE FACSIMILE EQUIPMENT AND THE COVER BODY CLOSING DEVICE, Mase.
- U.S. Pat. No. 4,837,590—titled: PORTABLE COMPUTER AND CARRYING CASE FOR MOBILE OFFICE, Sprague.
- U.S. Pat. No. 4,839,837titled: THREE LAYERED LAPTOP COMPUTER, Chang.
- U.S. Pat. No. 4,896,776—titled: PROTECTIVE CARRYING CASE FOR DATA PROCESSING EQUIPMENT, Kabanuk et al.

All of these prior art patents are fully incorporated herein by reference thereto. None of these prior art patents teach or suggest the particular container of this invention.

SUMMARY OF THE INVENTION

The present invention accomplishes its desired objects by broadly providing a container for carrying a portable computer. The container comprises a container base means having a generally hollow box-like structure with an open top and supporting a pair of hollow container side means which pivotally connect to the container base means to pivot together to close off the open top of the container base means such that the container has a suit case like formation. The container base means more particularly comprises an outer base bottom, a pair of outer base side walls bound to the outer base bottom, and a pair of outer base end walls bound to the pair of outer base side walls and to the outer base bottom.

The container base means further comprises an inner base bottom having a structure defining a plurality of base wells and spaced from the outer base bottom; a first inner base side wall spaced from one of outer base side walls and coupled thereto and bound to the inner base bottom; and a pair of inner base end walls spaced from the pair of outer base end walls and coupled thereto and bound to the first inner base side wall and to the inner base bottom. A second inner base side wall is spaced from one of the outer base side walls and is secured to the inner base bottom and to the pair of inner base end walls. An abridging member is provided for interconnecting the second inner base side wall and one of the outer base side walls. The abridging member has a structure defining a planar member connected to one of the outer base end walls and to one of the outer base side walls, an abridging platform connected to the planar member and rising therefrom, and an abridging perimetrical structure secured to the abridging platform at a lower level and surrounding an abridging aperture wherethrough portable computer articles may pass. The perimetrical structure is secured to one of the outer base side walls and to one of the outer base end walls.

The pair of container side means more specifically includes a first container side means and a second container side means. The first container side means is pivotally secured to one of the outer base side walls and to the first inner base side wall. The first container side means more particularly comprises a first outer side wall, a pair of first outer end walls secured to the first outer side wall, and a first outer top wall secured to the pair of the first outer end walls and to the first outer side wall. The first container side means further more particularly comprises a first inner side wall spaced from the first outer side wall and coupled thereto and a structure defining a plurality of first side wells and a first side ridge. A pair of first inner end walls is spaced from the pair of first outer end walls and is coupled thereto and is bound to the first inner side wall. A first inner top wall is secured to the pair of first inner end walls and to the first inner side wall and is spaced from the first outer top wall and coupled thereto.

The second container side means more particularly comprises a second outer side wall, a pair of second outer end walls secured to the second outer side wall, and a second outer top wall secured to the pair of the second outer end walls and to the second outer side wall. A second inner side wall is spaced from the second outer side wall and is coupled thereto and has a structure defining a plurality of second side wells and a second side ridge. A pair of second inner end walls is spaced from the pair of second outer end walls and is coupled thereto and is bound to the second inner side wall. A second inner top wall is secured to the pair of second inner end walls and to the second inner side wall and is spaced from the second outer top wall and is coupled thereto. As indicated, the first and the second container side means pivot together to close off the top of the container base means.

It is therefore an object of the present invention to provide a container for carrying computers, more particularly portable computers or word processors and the like.

These, together with the various ancillary objects and features which will become apparent to those skilled in the art as the following description proceeds, are attained by this novel container, a preferred embodiment being shown with reference to the accompanying drawings, by way of example only, wherein:

BRIEF DESCRIPTION OF THE DRAWINGS

FIG. 8 is a horizontal sectional view taken in direction of the arrows and along the plane of line 8—8 in FIG. 5;

FIG. 9 is a vertical sectional view taken in direction of the arrows and along the plane of line 9—9 in FIG. 5;

FIG. 10 is a vertical sectional view taken in direction of the arrows and along the plane of line 10—10 in FIG. 8;

FIG. 11 is a vertical sectional view taken in direction of the arrows and along the plane of line 11—11 in FIG. 8;

FIG. 12 is a vertical sectional view taken in direction of the arrows and along the plane of line 12—12 in FIG. 8;

FIG. 13 is a side elevational view taken in direction of the arrows and along the plane of line 13—13 in FIG. 9;

FIG. 14 is a top plan view of one of the container sides;

FIG. 15 is a vertical sectional view taken in direction of the arrows and along the plane of line 15—15 in FIG. 14;

FIG. 16 is a side elevational view taken in direction of the arrows and along the plane of line 16—16 in FIG. 14;

FIG. 17 is a vertical sectional view taken in direction of the arrows and along the plane of line 17—17 in FIG. 14;

FIG. 20 is a vertical sectional view taken in direction of the arrows and along the plane of line 20—20 in FIG. 8;

FIG. 21 is a vertical sectional view taken in direction of the arrows and along the plane of line 21—21 in FIG. 8; and FIG. 22 is a vertical sectional view taken in direction of the arrows and along the plane of line 22—22 in FIG. 8.

DETAILED DESCRIPTION OF THE PREFERRED EMBODIMENT OF THE INVENTION

Figure 1:
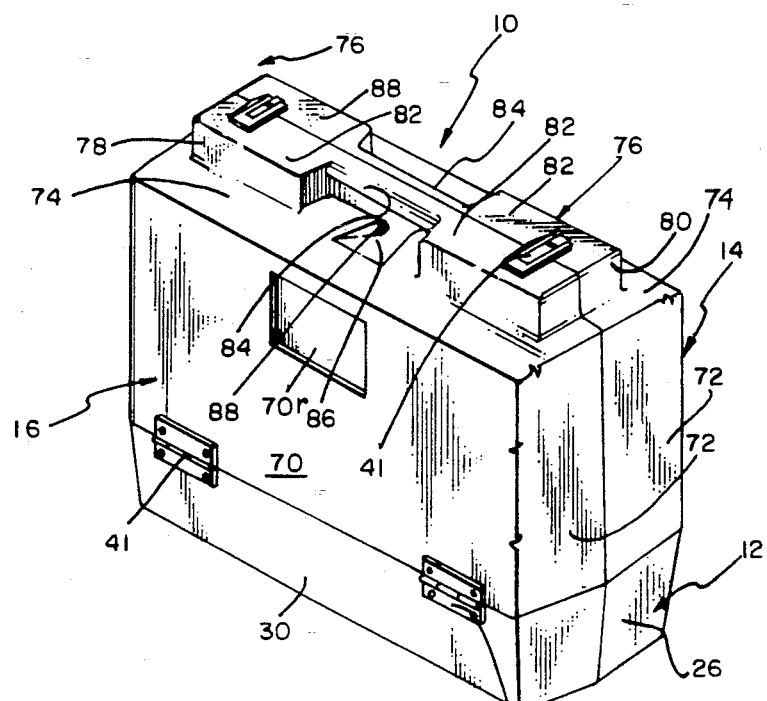
FIG. 1 is a perspective view of the container.
Figure 2:
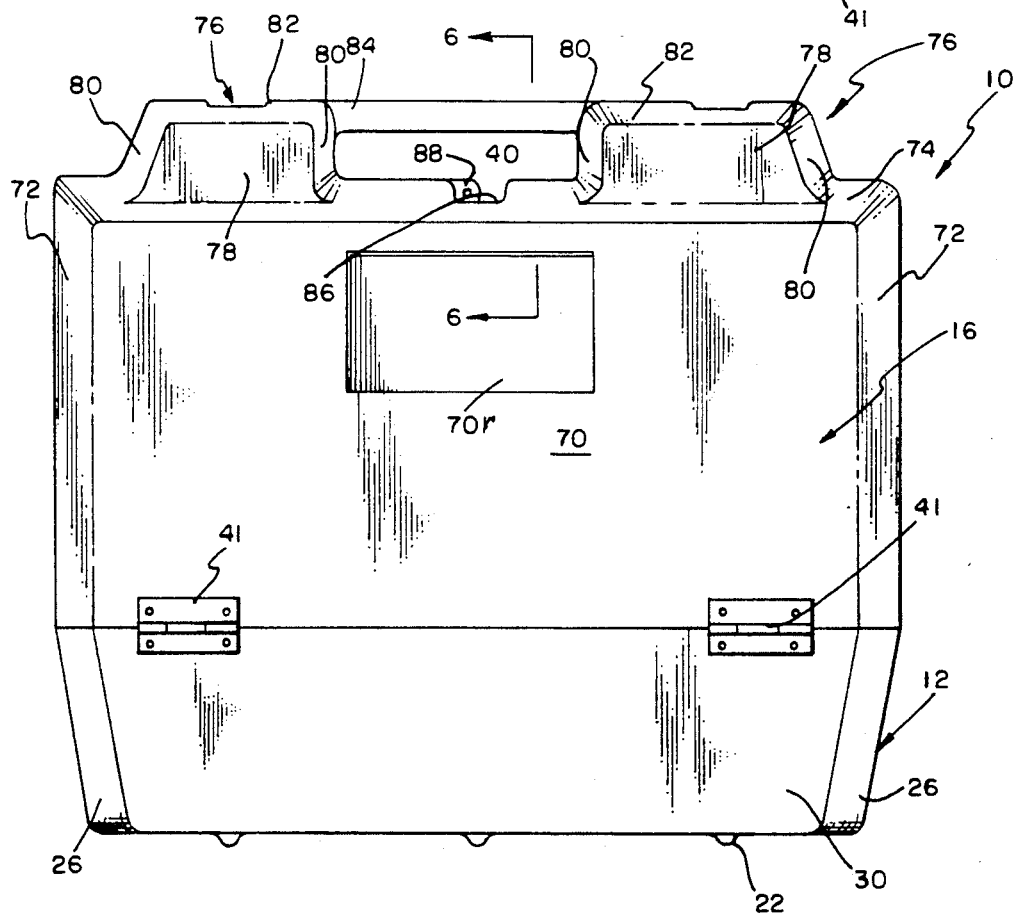
FIG. 2 is a side elevational view of the container.
Figure 3:
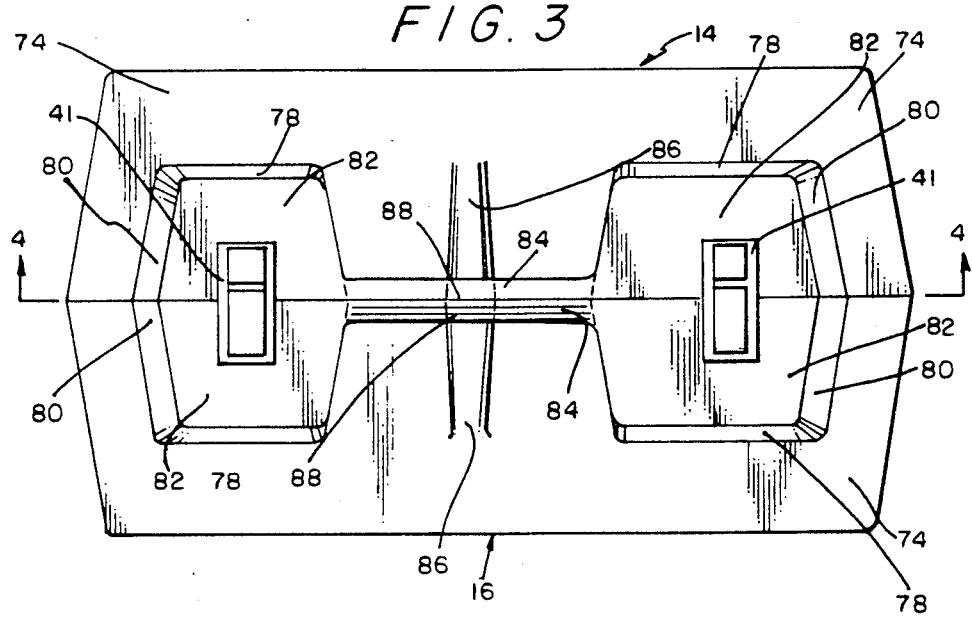
FIG. 3 is a top plan view of the container.
Figure 4:
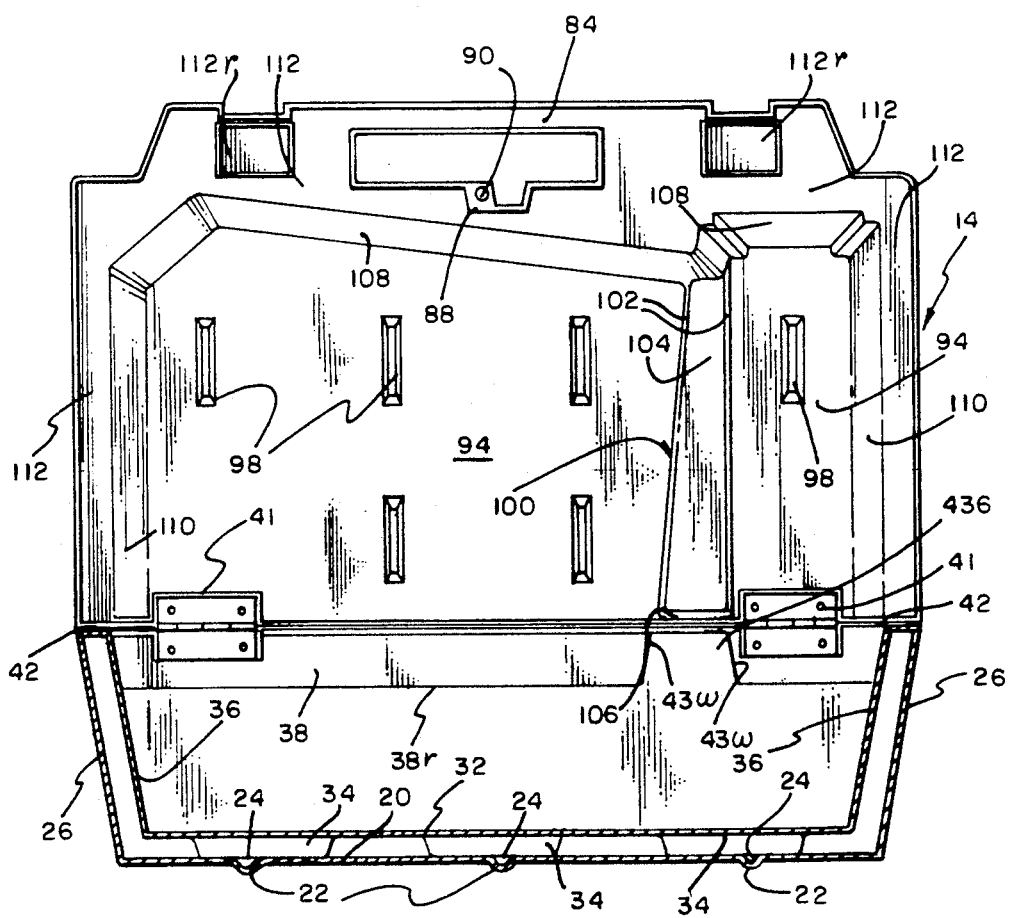
FIG. 4 is a vertical sectional view taken in direction of the arrows and along the plane of line 4—4 in FIG. 3.
Figure 5:
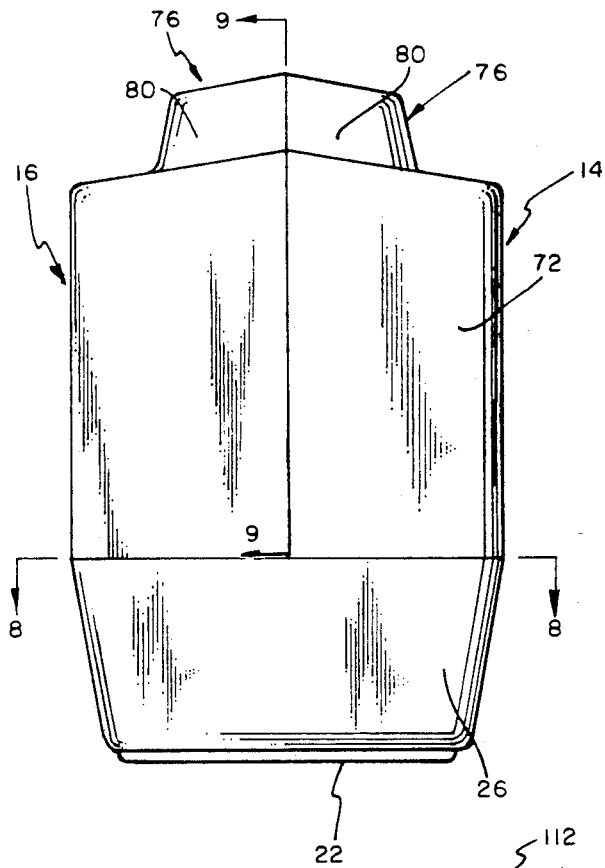
FIG. 5 is an end elevational view.
Figure 19:
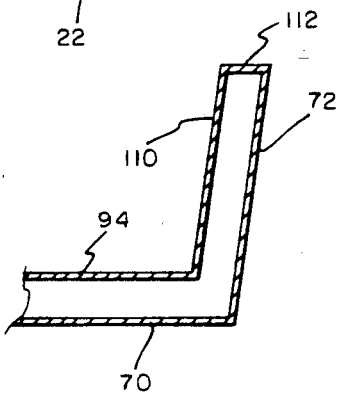
FIG. 19 is a vertical sectional view taken in direction of the arrows and along the plane of line 19—19 in FIG. 14.
Figure 7:
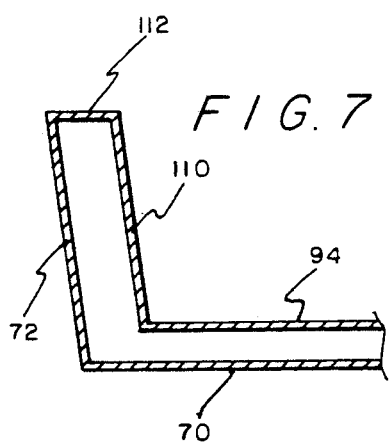
FIG. 7 is a vertical sectional view taken in direction of the arrows and along the plane of line 7—7 in FIG. 4.
Figure 6:
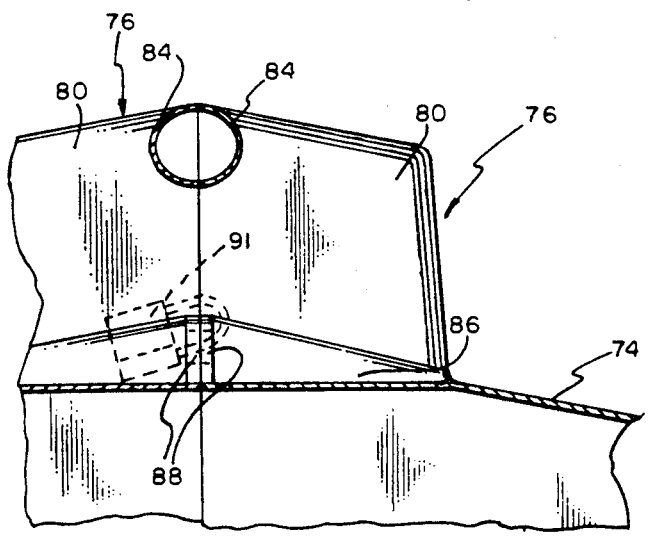
FIG. 6 is a vertical sectional view taken in direction of the arrows and along the plane of line 6—6 in FIG. 2.
Figure 18:
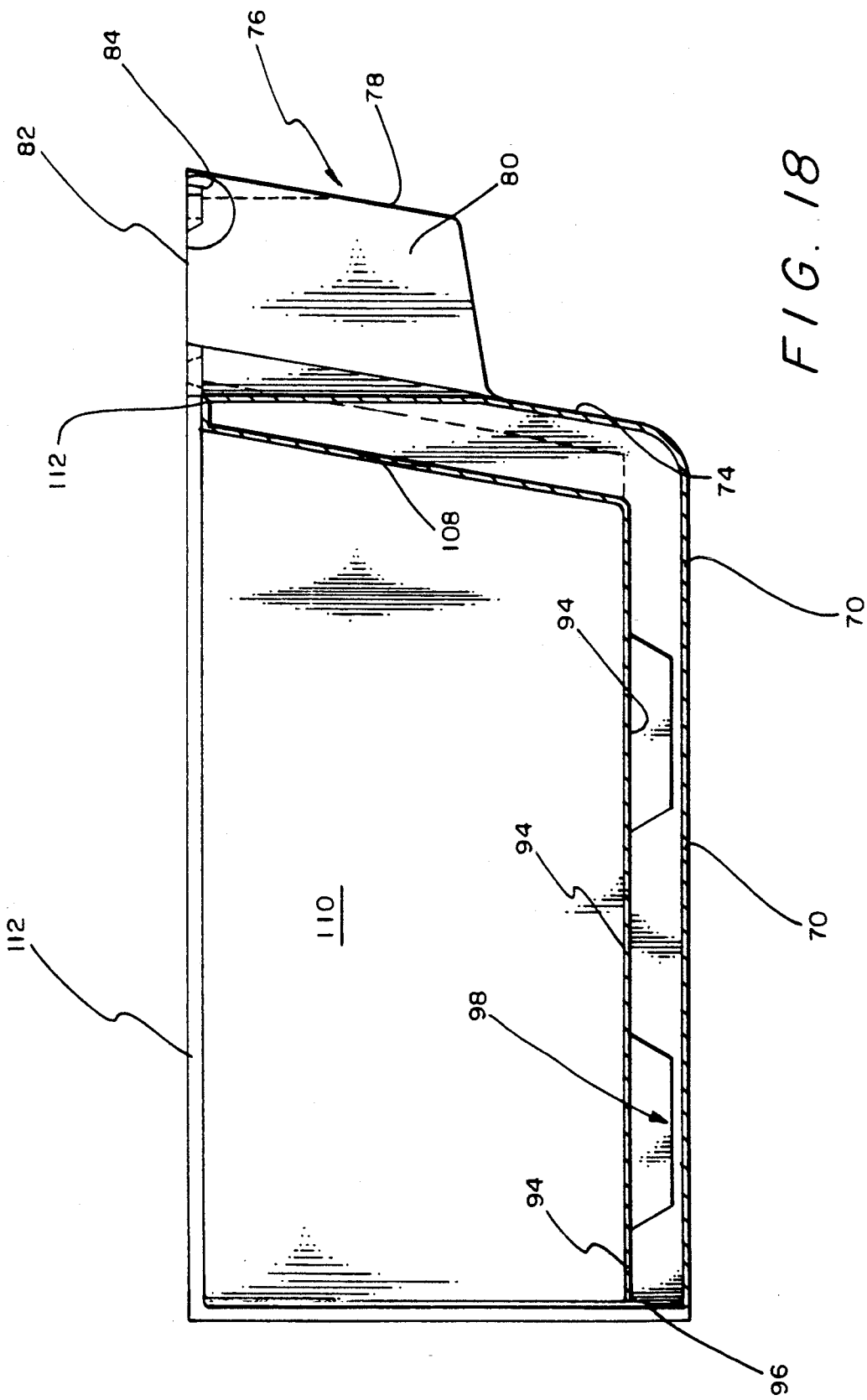
FIG. 18 is a vertical sectional view taken in direction of the arrows and along the plane of line 18—18 in FIG. 14.

Referring in detail now to the drawings wherein similar parts of the invention are identified by like reference numerals, there is seen a container, generally illustrated as 10, having a container base, generally illustrated as 12, and a pair of container sides, generally illustrated as 14 and 16 respectively, which are pivotally connected to the container base 12 such that when pivotally closed together, the container 10 resembles a closed suit-case (see FIG. 1).

The container base 12 has a doubled wall, doubled base hollow structure which more particularly includes a lower bottom 20 having a structure with transverse ridges 22 which protrude therefrom and define transverse channels 24 therebehind. A pair of lower end walls 26 and 26 connect to the lower bottom 20, and a pair of lower side walls 28 and 30 connect to the bottom 20 and to the pair of end walls 26 and 26. The hollow structure of the container base 12 further has an inner bottom 32 having a plurality of wells 34 and spaced from the bottom 20. A pair of inner end walls 36—36 connect to the bottom 32. A pair of opposed inner side walls 38 and 40 also connect to the bottom 32 and further connect to the end walls 36—36. Side wall 38 is formed with a pair of recesses 39—39 where hinges 41—41 connect and a platform 43 having a top 43t and sloping walls 43s—43s. The side wall 38 also has a ridge 38r. The platform 43 interrupts the ridge 38r.

A base perimetrical member 42 circumscribes the generally rectangular perimeter of the container base 12 and is connected to wall 30 and to an abridging member (generally identified below as 50), and to the end walls 26, 26 and 36, 36, and to the walls 28 and 38, for coupling or interconnecting respectively the same. As best shown in FIG. 8 the perimetrical member 42 has a structure defined by a pair of opposed triangular shaped ends 42e—42e and is interrupted by four wells, each generally illustrated as 46.

An abridging member, generally illustrated as 50 bridges the side walls 40 to the side wall 30 for interconnecting the same. The side walls 30 and 40 are preferably spaced from about 1 inch to about 6 inches apart, more referably from abut 2½ inches to about 3½ inches. The abridging member 50 includes a planar member 52 connecting to a generally upright member 54 (see FIG. 22) which in turn connects to a base of a well 46. The abridging member 50 also includes a platform member, generally illustrated as 56, rising up from the planar member 52. The platform member 56 more specifically includes a pair of opposed platform walls 58—58 (one of which connects to planar member 52) and a platform end wall 60 integrally secured to the side wall 40, to the platform walls 58—58 and a platform planar member 62 which is integrally secured to the end wall 60, to the walls 58—58 and to the perimetrical member 42. The abridging member 50 also includes an abridging perimetrical border or boundary 64 having a structure defining an opening or aperture, generally illustrated as 66 and is preferably 2 to 3 inches in a transverse dimensions. The boundary 64 is connected to the top of the wall 40, to one of the walls 58, to the end wall 36 and to a back wall 70 which ascends to connect to the perimetrical member 42.

Container sides 14 and 16 pivotally connect to the container base 12 via hinges 41—41—41—41 and are mirror images of one another. Thus, similar or identical components will be identified by like reference numerals on each container sides 14 and 16. State alternatively, if an element (e.g. wall, well, ridge, etc.) is identified in one container side (e.g. 14) by a certain number, the mirror image of that same element in the other container side (i.e. 16) will be identified by the same number. For simplication purposes, both container sides 14 and 16 will be described simultaneously.

Container sides 14 and 16 are both a doubled walled, doubled base hollow structure. More specifically container sides 14 and 16 have an outer side wall 70, a pair of outer end walls 72—72 secured to the outer side wall 70 and an outer top wall 74 secured to the pair of outer end walls 72—72 and to the outer side wall 70. Each side wall 70 has a shallow recess 70r. The outer top wall 74 has a pair of generally rectangular protrusion members, generally illustrated as 76, with each protrusion member 76 having a side wall 78, a pair of end walls 80—80 secured to the side wall 78, and a top wall 82 secured to the pair of end walls 80—80 and to the side wall 78. The hinges 41 couple opposed protrusion members 76—76 together to hold the container sides 14 and 16 in a closed position. A handle member 84 abridges contiguous protrusion members 76. The top wall 74 also has a channel 86 terminating in a lug 88 with an aperture 90 wherethrough a lock 91 may pass.

Container sides 14-16 also include an inner side wall 94 spaced from the outer side wall 70 and coupled thereto by a side perimetrical member 96. Each inner side wall 94 has a plurality of wells, generally illustrated as 98. Each inner side wall 94 also has a ridge member, generally illustrated as 100, interrupting the inner side wall 94 and protruding therefrom. Each ridge member 100 is formed with a pair of opposed side walls 102—102 integrally secured to the side wall 94 and a ridge top 104 integrally attached to the side walls 102—102. A ridge end wall 106 is secured to the side walls 102—102 and to the ridge top 104 and terminates them and extends down to and connects to the perimetrical member 96. The other ends of the side walls 102—102 and the ridge top 104 terminate in an upright inner back wall 108 that also integrally attaches to the side wall 94 and is spaced from the outer top wall 74. A pair of inner end walls 110—110 connect to both the inner side wall 94 and to the inner back wall 108, and is spaced from the outer top wall 74. A perimetrical member 112 (which is generally U shaped) is provided and secures to the tops of both the outer end walls 72—72 and to the inner end walls 110—110 to couple respectively them together. Perimetrical members 112 also secures to tops of the outer top wall 74 and to the inner back wall 108 to couple them together. Each of the perimetrical member 112 is formed with a pair of shallow recesses 112r—112r.

Because container sides 14 and 16 are mirror image of one another when they are pivoted together to close off the top of the open base 12, the ridge member 100 of container side 14 is spacedly opposed to the ridge member 100 of container side 14. When container side 16 is completely closed, the ridge end wall 106 of the ridge member 100 of container side 16 is in close proximity to the platform planar member 62 of the platform member 56 in the container base 12. Similarly, when container side 14 is completely closed the ridge end wall 106 of the ridge member 100 of container side 14 is in close proximity to the top 43t of the platform 43 in the container base 12. When both container sides 14 and 16 are completely closed, the perimetrical ridge 112 of container side 14 is essentially flushed against the perimetrical ridge 112 of container side 16, and the recesses 112r—112r of one ridge 112 is opposed to the recesses of 112r—112r of the other ridge 112. Also, the handle member 84 of container side 16 is essentially flushed against the handle member 84 of container side 14. When the two container sides 14 and 16 are closed, the container 10 has the appearance of FIG. 1.

Figure 23:
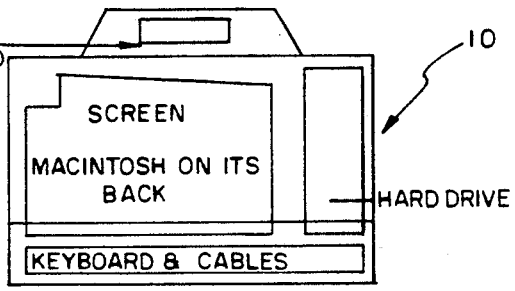
Figure 24:
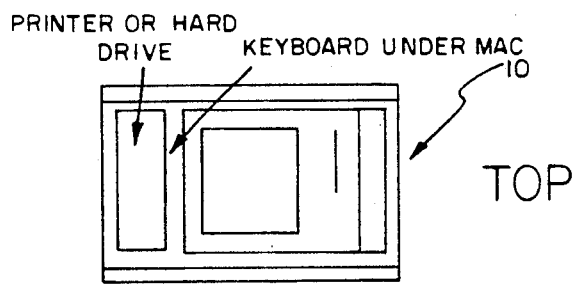

The container 10 of this invention may be formed from any suitable materials, such as plastic(polypropylene, polyethylene, etc.) and is adaptable for transporting portable computers, especially Apple Macintosh computers/word processors. As best shown in FIGS. 23-24, the printer or harddrive would lodge between the ridge members 100 and 100 and inner end walls 110 and 110 of the container sides 14 and 16, respectively.

The printer or harddrive would rest on planar member 52 of the abridging member 50 of the container base 12. The keyboard and cables would rest on inner bottom 32 of the container base 12. The screen would face upwardly and the Apple Macintosh sets or rests on its back and supported by the abridging perimetrical border or boundary 64 of the abridging member 50 and the ridge 38r of the side wall 38. Cables, mouse and other items may be stored through aperture 64 of the perimetrical boundary 64.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention a set forth.

We claim:

1. A container for carrying a portable computer comprising a container base means comprising an outer base bottom, a pair of outer base side walls bound to the outer base bottom, and a pair of outer base end walls bound to the pair of outer base side walls and to the outer base bottom, and an inner base bottom having a structure defining a plurality of base wells and spaced from said outer base bottom, a first inner base side wall spaced from one of said outer base side walls and coupled thereto and bound to said inner base bottom, a pair of inner base end walls spaced from said pair of outer base end walls and coupled thereto and bound to said first inner base side wall and to said inner base bottom, and a second inner base side wall spaced from one of said outer base side walls and secured to said inner base bottom and to said pair of inner base end walls; an abridging member interconnecting said second inner base side wall and one of the outer base side walls; said abridging member having a structure defining a planar member connected to one of the outer base end walls and to one of the outer base side walls, an abridging platform connected to the planar member and rising therefrom, and an abridging perimetrical structure secured to the abridging platform and surrounding an abridging aperture wherethrough portable computer articles may pass, said perimetrical structure being secured to one of said outer base side walls and to one of said outer base end walls; a first container side means pivotally secured to one of said outer base side walls and to said first inner base side wall; said first container side means comprising a first outer side wall, a pair of first outer end walls secured to the first outer side wall, and a first outer top wall secured to the pair of the first outer end walls and to the first outer side wall; and a first inner side wall spaced from the first outer side wall and coupled thereto and having a structure defining a plurality of first side wells and a first side ridge, a pair of first inner end walls spaced from the pair of first outer end walls and coupled thereto and bound to said first inner side wall, and a first inner top wall secured to the pair of first inner end walls and to the first inner side wall and spaced from the first outer top wall and coupled thereto; a second container side means pivotally secured to one of said outer base side walls; said second container side means comprising a second outer side wall, a pair of second outer end walls secured to the second outer side wall, and a second outer top wall secured to the pair of the second outer end walls and to the second outer side wall; and a second inner side wall spaced from the second outer side wall and coupled thereto and having a structure defining a plurality of second side wells and a second side ridge, a pair of second inner end walls spaced from the pair of second outer end walls and coupled thereto and bound to said second inner side wall, and a second inner top wall secured to the pair of second inner end walls and to the second inner side wall and spaced from the second outer top wall and coupled thereto; and said first and said second container side means pivoting together to close off the container base means.

2. The container of claim 1 wherein said outer base bottom has a structure defining a plurality of transverse ridges protruding therefrom.

3. The container of claim 2 wherein said outer base end walls and said inner base end walls are coupled with a base perimetrical structure which is generally triangular in shape.

4. The container of claim 3 wherein said base perimetrical structure couples the abridging member to one of the outer base side walls, and one of the outer base side walls to one of the inner base end walls, said base perimetrical structure being interrupted by a plurality of perimetrical wells.

5. A container for carrying a portable computer comprising a container base means having an outer base bottom, a pair of outer base side walls bound to the outer base bottom, and a pair of outer base end walls bound to the pair of outer base side walls and to the outer base bottom, and an inner base bottom having a structure defining a plurality of base wells and spaced from said outer base bottom, a first inner base side wall spaced from one of said outer base side walls and coupled thereto and bound to said inner base bottom, a pair of inner base end walls spaced from said pair of outer base end walls and coupled thereto and bound to said first inner base side wall and to said inner base bottom, and a second inner base side wall spaced from one of said outer base side walls and secured to said inner base bottom and to said pair of inner base end walls; an abridging member interconnecting said second inner base side wall and one of the outer base side walls; said abridging member having a structure defining a planar member connected to one of the outer base end walls and to one of the outer base side walls, an abridging platform connected to the planar member and rising therefrom, and an abridging perimetrical structure secured to the abridging platform and surrounding an abridging aperture wherethrough portable computer articles may pass, said perimetrical structure being secured to one of said outer base side walls and to one of said outer base end walls; a first container side means and a second container side means pivotally secured to one of said outer base side walls.

6. The container of claim 5 wherein said container base means has a defined base width, and said first and second container side means have a defined first side width and a defined second side width; said first side width and said second side width together essentially equal the defined base width.

7. The container of claim 6 wherein said first and said second container side means are each double walled.

* * * * *